United States Patent
Miller et al.

(10) Patent No.: US 8,376,396 B2
(45) Date of Patent: Feb. 19, 2013

(54) MULTI-CHAMBER KNEE AIRBAG

(75) Inventors: Ryan A. Miller, Columbus, OH (US); Eric M. Heitkamp, Columbus, OH (US)

(73) Assignee: Honda Motor Co., Ltd., Tokyo (JP)

(*) Notice: Subject to any disclaimer, the term of this patent is extended or adjusted under 35 U.S.C. 154(b) by 407 days.

(21) Appl. No.: 12/688,488

(22) Filed: Jan. 15, 2010

(65) Prior Publication Data

US 2011/0175334 A1 Jul. 21, 2011

(51) Int. Cl.
  *B60R 21/233* (2006.01)
(52) U.S. Cl. ............ 280/729; 280/730.1; 280/736
(58) Field of Classification Search ............ 280/728.1, 280/729, 730.1, 736
See application file for complete search history.

(56) References Cited

U.S. PATENT DOCUMENTS

| | | | | |
|---|---|---|---|---|
| 3,747,952 A * | 7/1973 | Graebe | ............. | 280/730.1 |
| 3,752,501 A * | 8/1973 | Daniel et al. | ............. | 280/729 |
| 3,768,830 A | 10/1973 | Hass | | |
| 4,290,627 A * | 9/1981 | Cumming et al. | ............. | 280/729 |
| 5,458,366 A | 10/1995 | Hock et al. | | |
| 5,577,765 A * | 11/1996 | Takeda et al. | ............. | 280/729 |
| 6,086,092 A * | 7/2000 | Hill | ............. | 280/729 |
| 6,135,493 A | 10/2000 | Jost et al. | | |
| 6,158,767 A * | 12/2000 | Sinnhuber | ............. | 280/730.2 |
| 6,419,262 B1* | 7/2002 | Fendt et al. | ............. | 280/729 |
| 6,685,217 B2* | 2/2004 | Abe | ............. | 280/730.1 |
| 6,866,291 B2* | 3/2005 | Abe et al. | ............. | 280/729 |
| 6,916,039 B2* | 7/2005 | Abe | ............. | 280/729 |
| 7,316,415 B2* | 1/2008 | Jamison | ............. | 280/729 |
| 7,347,445 B2* | 3/2008 | Choi | ............. | 280/729 |
| 7,597,347 B2* | 10/2009 | Hasebe et al. | ............. | 280/729 |
| 7,604,252 B2* | 10/2009 | Heitplatz et al. | ............. | 280/730.1 |
| 7,648,158 B2* | 1/2010 | Hasebe | ............. | 280/729 |
| 7,681,909 B2* | 3/2010 | Idomoto et al. | ............. | 280/729 |
| 7,963,550 B2* | 6/2011 | Hong et al. | ............. | 280/730.1 |
| 2003/0116945 A1* | 6/2003 | Abe | ............. | 280/729 |
| 2007/0200321 A1* | 8/2007 | Heitplatz et al. | ............. | 280/730.1 |
| 2007/0228699 A1* | 10/2007 | Bederka et al. | ............. | 280/730.2 |
| 2007/0246920 A1* | 10/2007 | Abele et al. | ............. | 280/730.1 |
| 2007/0267852 A1* | 11/2007 | Enders | ............. | 280/730.1 |
| 2008/0036189 A1* | 2/2008 | Pausch | ............. | 280/743.1 |
| 2009/0001692 A1 | 1/2009 | Denys et al. | | |
| 2011/0079991 A1* | 4/2011 | Ravenberg et al. | ............. | 280/740 |

FOREIGN PATENT DOCUMENTS

| | | |
|---|---|---|
| JP | 2006088856 | 4/2006 |
| JP | 2008120106 | 5/2008 |
| JP | 2008044594 | 1/2010 |

* cited by examiner

*Primary Examiner* — Joseph Rocca
*Assistant Examiner* — Timothy Wilhelm
(74) *Attorney, Agent, or Firm* — Rankin Hill & Clark LLP

(57) ABSTRACT

An airbag module for a vehicle includes a gas generator for generating a gas and a multi-chamber airbag operatively connected to the gas generator for receiving the gas. The airbag defines a first inflation chamber, at least one second inflation chamber, at least one third inflation chamber and a fourth inflation chamber. The airbag includes internal vents configured to allow selective communication between the first chamber and each of the at least one second chamber and the at least one third chamber and selective communication between the at least one second chamber and the fourth chamber. The internal vents are configured to maintain a higher pressure in selective chambers by restricting ability of the gas to escape the selective chamber. The order of internal venting between the respective inflation chambers controls the pressure and timing of inflation of the multi-chamber airbag.

23 Claims, 6 Drawing Sheets

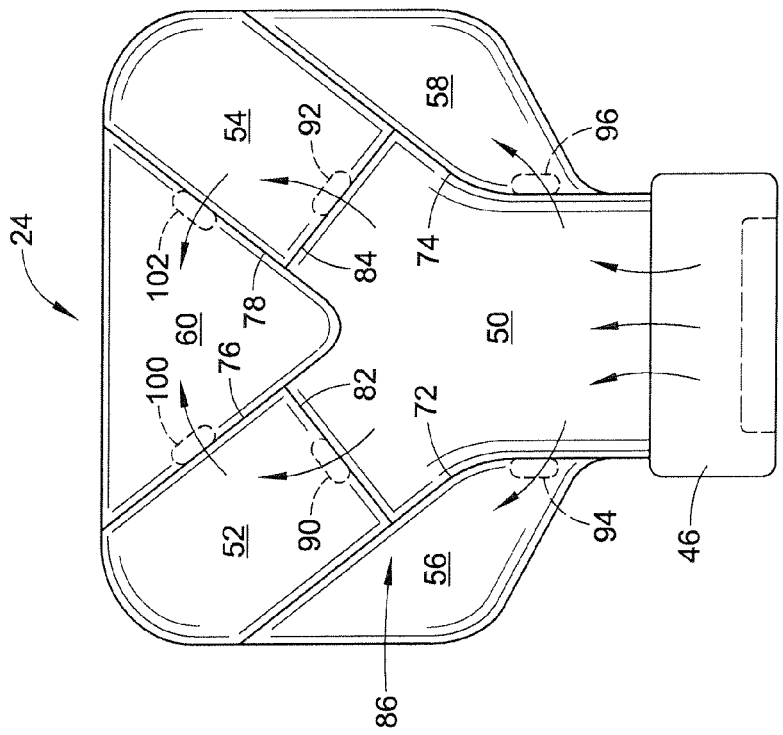
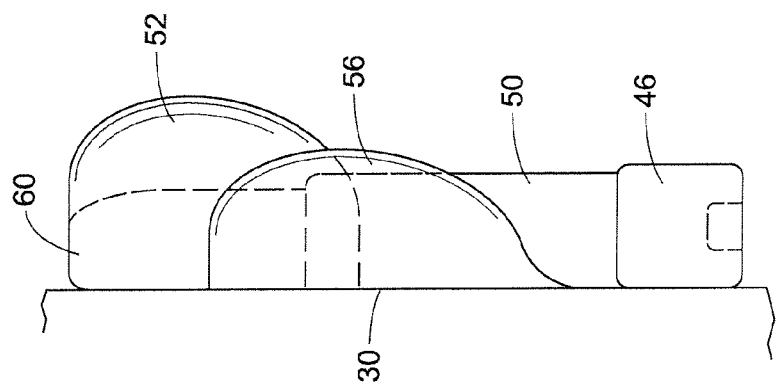

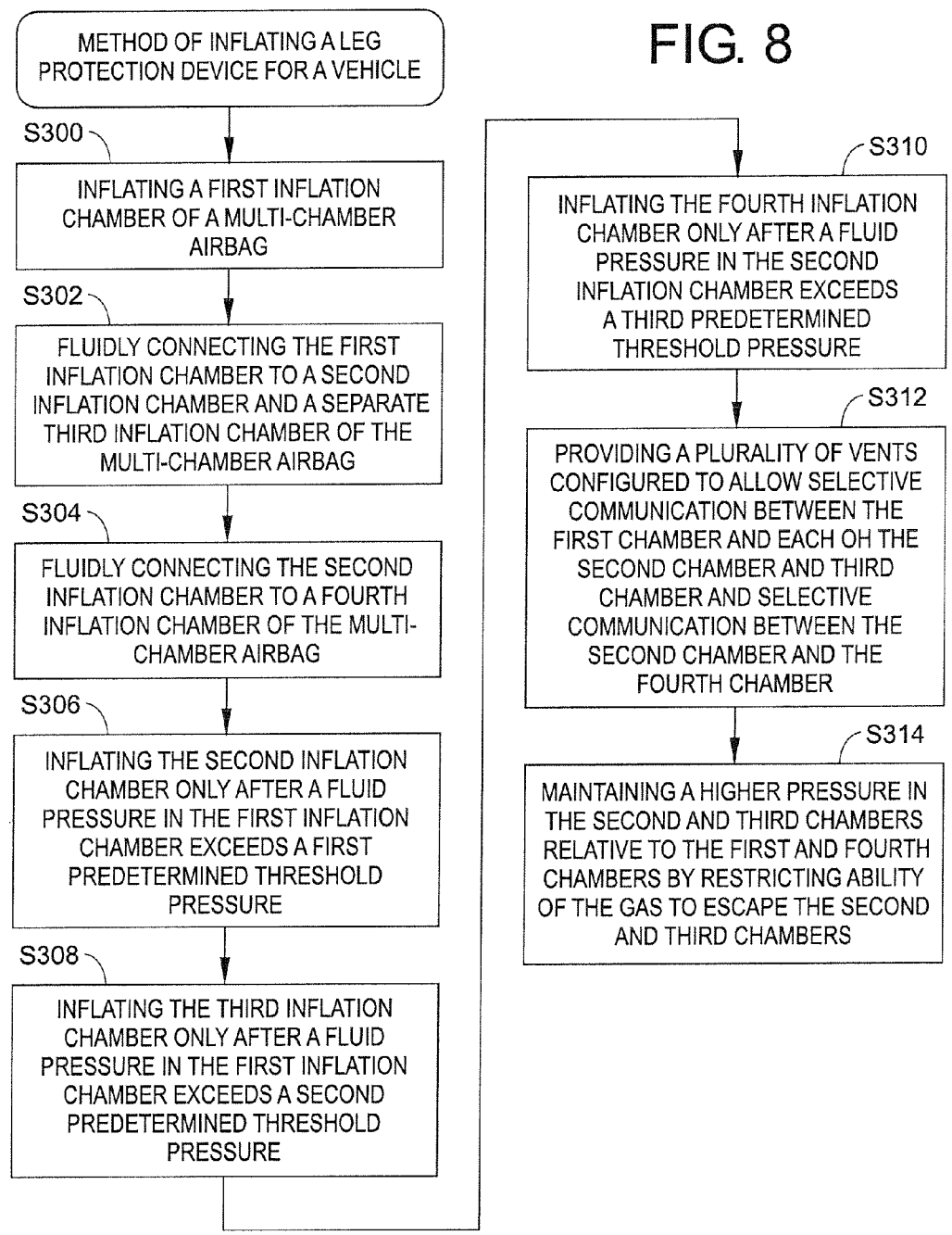

MULTI-CHAMBER KNEE AIRBAG

BACKGROUND

Exemplary embodiments herein relate to motor vehicle supplemental restraint systems, and more particularly, to a multi-chamber knee airbag for protecting an occupant from colliding with an object such as an interior panel in front of a seat in the event of a vehicle collision.

Vehicles generally provide some kind of supplemental restraint system. Often, these supplemental restraint systems take the form of inflatable devices or restraints. In some cases, an inflatable restraint system includes a leg protection device having an airbag deployed in front of the vehicle occupant to receive the legs of the occupant in the event of a vehicle collision so as to protect the vehicle occupant.

In one known leg protection device, a single chamber is formed inside the airbag. The occupant sitting on a vehicle seat may assume various sitting postures, for example, with knees apart and/or with legs extending sideways. The positions of the knees may be often spaced apart from a center of the seat. Therefore, the airbag of the leg protection device is designed to rapidly spread in the vehicle lateral direction after start of inflation. Having a single chamber, a dimension of the inflated airbag in a vehicle longitudinal direction (hereinafter, sometimes referred to as a thickness of an airbag) tends to be large. Therefore, sufficient inflation of the airbag can provide a large thickness for receiving the occupant's legs. However, if the airbag is designed to expand laterally as well, the inflation volume can become so large that a gas generator or inflator having a significantly large generating capacity is required.

In another known leg protection device, the airbag includes multiple chambers which are separated by partitions formed inside the airbag. The partitions have through ports or holes for the gas to flow between the chambers. Since the multi-chamber airbag has a relatively large volume, the gas generator is required to have a large capacity to quickly inflate the chambers located on a periphery of the airbag, resulting in relatively poor gas efficiency. Further, it can be difficult to control stiffness of different sections of the known airbag for different sized occupants.

BRIEF DESCRIPTION

According to one aspect, an airbag module for a vehicle includes a gas generator for generating a gas and a multi-chamber airbag operatively connected to the gas generator for receiving the gas therefrom. The airbag defines at least one first inflation chamber, at least one second inflation chamber, at least one third inflation chamber and at least one fourth inflation chamber. The airbag includes a plurality of internal vents configured to allow selective communication between the at least one first chamber and each of the at least one second chamber and the at least one third chamber and selective communication between the at least one second chamber and the at least one fourth chamber. The plurality of internal vents is configured to create a higher pressure in one or more selective chambers by restricting an ability of the gas to escape the one or more selective chambers. An order of internal venting between the respective inflation chamber is predetermined so as to control pressure and inflation of the multi-chamber airbag.

According to another aspect, a leg protection device for a vehicle includes a gas generator for generating gas and a multi-chamber knee airbag operatively connected to the gas generator for receiving the gas therefrom for inflation. The airbag includes a first inflation chamber, a pair of second inflation chambers, a pair of third inflation chambers and a fourth inflation chamber. The first chamber has an inlet for directly receiving the gas generated from the gas generator. Each second inflation chamber has an inlet valve communicating with the first chamber. Each third inflation chamber has an inlet valve communicating with the first chamber. The fourth chamber has a pair of inlet valves, each inlet valve communicating with one of the pair of third chambers. The inlet valves are configured to maintain a higher pressure in the second and third chambers relative to the first and fourth chambers during inflation. Actuation of the gas generator inflates the first chamber. The gas then flows from the first chamber into each of the second chambers and the third chambers. The gas then flows from the third chambers into the fourth chamber. The separate chambers provide varying coverage for different sized occupants and different crash modes.

According to yet another aspect, a knee airbag module for a vehicle includes a gas generator for generating gas and a multi-chamber airbag operatively connected to the gas generator for receiving the gas therefrom. The airbag includes a plurality of internal baffles defining separate inflation chambers configured to have differing pressures during inflation for providing varying coverage for different sized occupants. The separate chambers include a first inflation chamber, a pair of second inflation chambers, a pair of third inflation chambers and a fourth inflation chamber. The first inflation chamber is tuned for occupants with physical characteristics similar to an AF5% crash test dummy. The pair of second inflation chambers is tuned for occupants with physical characteristics at least similar to an AM50% crash test dummy. The pair of third inflation chambers is tuned for out of position occupants to protect knee impacts that are outside of a regulated knee impact zone. The fourth inflation chamber provides protection against contact with a steering column cover of the vehicle. Actuation of the gas generator inflates the first chamber. The gas then flows from the first chamber into the second chambers and then the third chambers only after a fluid pressure in the first inflation chamber exceeds a predetermined first threshold pressure. The gas then flows from each second chamber into the fourth chamber only after a fluid pressure in each second inflation chamber exceeds a predetermined second threshold pressure.

According to still yet another aspect, a method of inflating a leg protection device for a vehicle is provided. A first inflation chamber of a multi-chamber airbag is inflated. The first inflation chamber is fluidly connected to a second inflation chamber and a separate third inflation chamber of the multi-chamber airbag. The second inflation chamber is fluidly connected to a fourth inflation chamber of the multi-chamber airbag. The second inflation chamber is inflated only after a fluid pressure in the first inflation chamber exceeds a first predetermined threshold pressure. The third inflation chamber is inflated only after a fluid pressure in the first inflation chamber exceeds a second predetermined threshold pressure. The fourth inflation chamber is inflated only after a fluid pressure in the second inflation chamber exceeds a third predetermined threshold pressure.

BRIEF DESCRIPTION OF THE DRAWINGS

FIG. 3 is a front view of the exemplary lower protection device of FIG. 1.

FIG. 4 is side view of the exemplary lower protection device of FIG. 1.

FIG. 8 is a flow chart illustrating a method of inflating a lower protection device for a vehicle.

DETAILED DESCRIPTION

Figure 1:
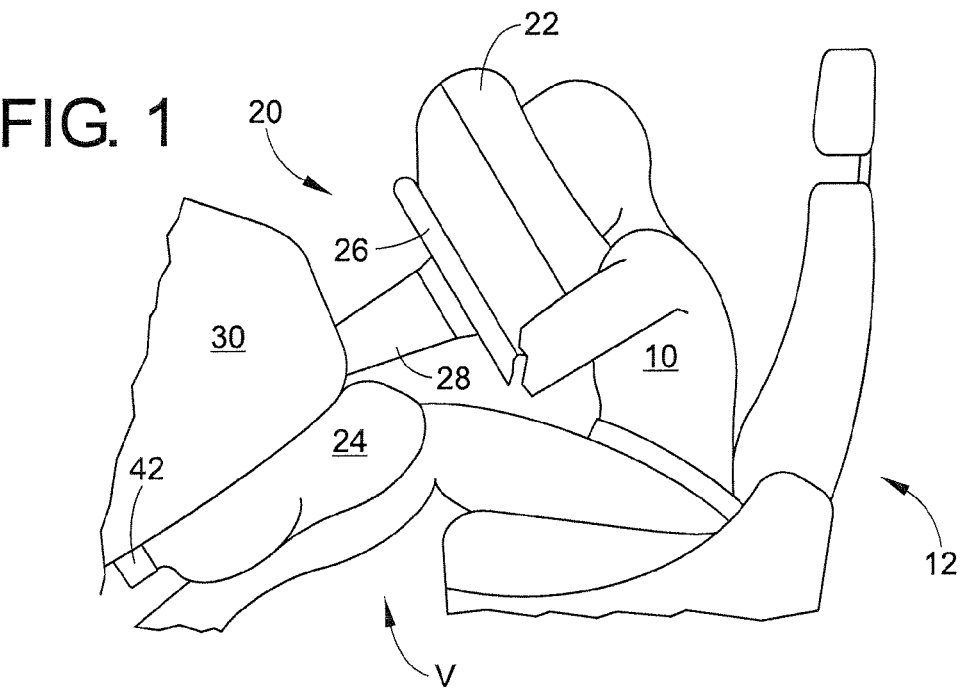
FIG. 1 is a schematic side view of a vehicle supplemental restraint system including a head/torso protection device and an exemplary lower protection device. An occupant is seated in the driver's seat and each of the protection devices is deployed.
Figure 2:
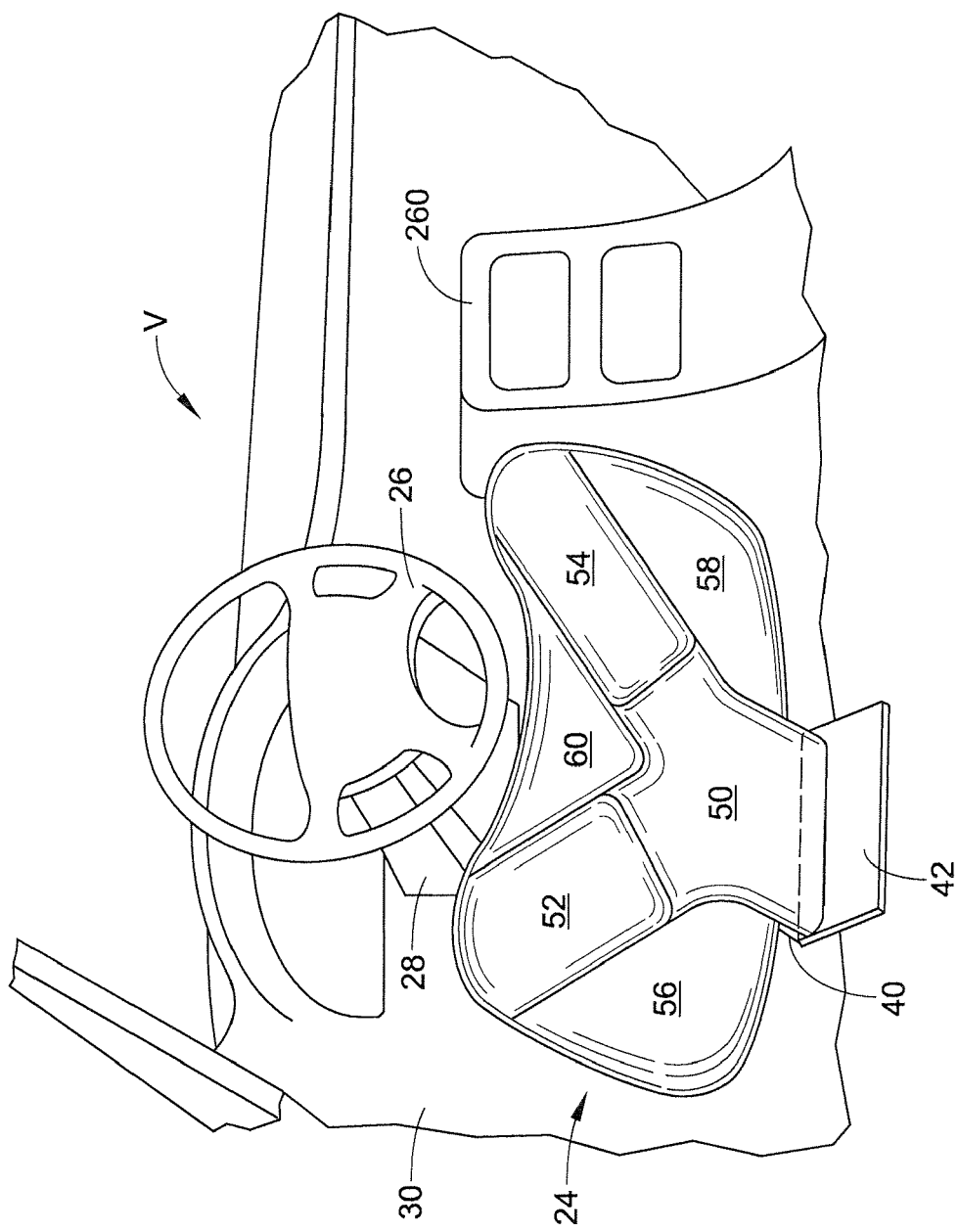
FIG. 2 is a front perspective view of the exemplary lower protection device of FIG. 1 deployed in a vehicle.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1 and 2 schematically depict an occupant or driver 10 seated in a front seat 12 of an automotive vehicle V. The vehicle V has installed therein a supplemental restraint system 20 for protecting the front-seat occupant 10 during a vehicle collision. The supplemental restraint system 20 includes a known head/torso protection device having a passenger airbag 22 and an exemplary lower protection device having a knee airbag 24. As shown, the head/torso protection device is deployed from a steering wheel 26 attached to a steering column 28. The steering column 28 projects from the dashboard 30 located in front of the driver's seat 12. The knee airbag 24 is deployed from a lower portion of the dashboard 30. The airbags 22, 24 can be formed from any material which is commonly used for airbags.

As is known to one skilled in the art, the supplemental passenger restraint system 20 can include an actuation circuit having a crash sensor, such as, for example, an inertia switch or an accelerometer, and a controller positioned in the vehicle V (neither shown). Upon detection of a crash condition requiring protection of the occupant 10, as sensed by the crash sensor, the controller directs the actuation circuit to initiate deployment of the head/torso airbag 22 and/or the knee airbag 24. In addition to a vehicle speed, other operational parameters, such as confirmation that the occupant 10 is using a seatbelt, can be measured or identified to assess whether the head/torso airbag 22 and/or the knee airbag 24 should be deployed.

As is well known, the head/torso airbag 22 helps prevent contact between occupant 10 and the steering wheel 26 and/or dashboard 30 during a vehicle collision. The head/torso airbag 22 inflates into the vehicle passenger compartment through a deployment opening (not shown) in the steering wheel 26. The force needed to open the deployment opening comes from the initial pressurization of head/torso airbag 22 by a gas generator or inflator (not shown). Upon activation, the inflator produces a gas or inflation fluid under pressure and directs the inflation fluid into the head/torso airbag 22. After the head/torso airbag 22 is inflated with sufficient pressure to push open the deployment opening and enable movement of the head/torso airbag 22 through the deployment opening, the head/torso airbag 22 moves into a fully inflated position in the vehicle passenger compartment.

As shown, the exemplary knee airbag 24 inflates through a deployment opening 40 located in a lower portion of the dashboard 30. A cover 42 is mounted on the dashboard 30 for closing the deployment opening 40. In its inflated position, the knee airbag 24 covers the lower half of the dashboard 30 and is positioned generally between the dashboard 30 and the leg portions (e.g., the knees and shins) of the occupant 10 sitting in the front seat 12. An upper portion of the knee airbag 24 is designed to reach an area near a lower portion of the steering column 28 in a completely inflated state. Similar to the head/torso airbag 22, the force that is needed to open the deployment opening 40 comes from the initial pressurization of knee airbag 24 by a gas generator or inflator 46 that generates a gas under pressure. The knee airbag 24 is operatively connected to the gas generator 46 for receiving the gas therefrom. The increased pressure causes the knee airbag 24 to inflate outwardly through the deployment opening 40 into a fully inflated position in the passenger compartment.

With reference to FIGS. 3 and 4, the exemplary knee airbag 24 is a multi-chamber knee airbag including a plurality of separate inflation chambers, particularly, at least one first inflation chamber (e.g. chamber 50), at least one second inflation chamber (e.g., chambers 52, 54), at least one third inflation chamber (e.g., chambers 56, 58) and at least one fourth inflation chamber (e.g., chamber 60). As shown, the multi-chamber knee airbag 24 of the illustrated embodiment includes a single first inflation chamber 50, a pair of spaced apart second inflation chambers 52 and 54, a pair of spaced apart third inflation chambers 56 and 58 and a single fourth inflation chamber 60. Each second chamber 52, 54 is deployed generally above one of the third chambers 56, 58. Particularly, second chamber 52 is located above third chamber 56 and second chamber 54 is located above third chamber 58. The fourth chamber 60 is deployed above the first chamber 50 and between the pair of second chambers 52, 54. With this configuration, an outer periphery of the knee airbag 24 is generally defined by the second, third and fourth chambers 52, 54, 56, 58, 60. The first chamber 50 is flanked by the stacked second and third chambers 52, 54, 56, 58 and is substantially surrounded by the second, third and fourth chambers. As shown, the knee airbag 24 has a generally rectangular shape, although alternative shapes are contemplated, and a depth of each of the first chamber 50 and fourth chamber 60 is less than a depth of each of the second chambers 52, 54 and the third chambers 56, 58, though this is not required.

To form the separate inflation chambers 50, 52, 54, 56, 58, 60, the knee airbag 24 includes a plurality of internal baffles or panels, particularly, a pair of first internal baffles 72 and 74, a pair of second internal baffles 76 and 78 spaced from the pair of first internal baffles and a pair of third internal baffles 82 and 84. The pair of third internal baffles 82, 84 interconnect the pairs of first and second internal baffles 72, 74 and 76, 78. As shown in FIG. 3, the pair of first and second baffles 72, 74, 76, 78 together form a generally Y-shaped inflation chamber 86 which projects from the gas generator 46. The generally Y-shaped inflation chamber 86 at least partially defines or is comprised by the first chamber 50 and the two spaced apart second chambers 52, 54. Each first baffle 72, 74 separates the first chamber 50 and one of the second chambers 52, 54 from one of the third chambers 56, 58. Each second baffle 76, 78 separates the first chamber 50 and one of the second chambers 52, 54 from the fourth chamber 60. Each third internal baffle 82, 84 spans between one of the first baffles 72, 74 and one of the second baffles 76, 78 for separating the first chamber 50 from one of the second chambers 52, 54. As shown, third internal baffle 82 spans between first baffle 72 and second baffle 76 for separating the first chamber 50 from second chamber 52. Third internal baffle 84 spans between first baffle 74 and second baffle 78 for separating the first chamber 50 from second chamber 54. The pair of third internal baffles 82, 84 together form a lower portion of the fourth chamber 60 having a generally V-shape. As a person skilled in the art will understand, the manner of joining the plurality of internal baffles or panels within the exemplary knee airbag 24 is not a limiting feature of the exemplary knee airbag 24.

To effect a sequential expansion of the inflation chambers 50, 52, 54, 56, 58, 60, the knee airbag 24 further includes a plurality of vents or inlet valves 90, 92, 94, 96, 100, 102. The plurality of vents can be configured to allow selective communication between the first chamber 50 and each of the second chambers 52, 54 and the third chambers 56, 58, and selective communication between the second chambers 52, 54 and the fourth chamber 60. In one embodiment, the plurality of internal vents 90, 92, 94, 96, 100, 102 is configured to sequentially inflate the first chamber 50, then the second chambers 52, 54, next the third chambers 56, 58 and finally the fourth chamber 60. It is to be appreciated that other sequences could be used and that sequences can overlap (e.g., the third chambers 56, 58 can begin filling from the first chamber 50 before the second chambers 52, 54 are filled from the first chamber 50). The order of internal venting between the respective inflation chambers can control the pressure and timing of inflation of the multi-chamber airbag 24. In the same or another embodiment, the plurality of vents can be configured to cause certain chambers to exhibit increased pressure during impact after the airbag 24 is deployed. For example, the first chamber 50 can exhibit a reduced pressure during impact relative to the second chambers 52, 54.

More specifically, in the illustrated embodiment, third internal baffle 82 includes vent 90 for selective communication between the first chamber 50 and second chamber 52. Third internal baffle 84 includes vent 92 for selective communication between the first chamber 50 and second chamber 54. First internal baffle 72 includes vent 94 for selective communication between the first chamber 50 and third chamber 56. First internal baffle 74 includes vent 96 for selective communication between the first chamber 50 and third chamber 58. Second internal baffle 76 includes vent 100 for selective communication between second chamber 52 and the fourth chamber 60. Finally, second internal baffle 78 includes vent 102 for selective communication between second chamber 54 and the fourth chamber 60.

The vents 90, 92, 94, 96, 100, 102 can each be one of a plurality of different vent types. Some exemplary vent types will be described herein, but it is to be appreciated that vent types other than those discussed herein could be employed. By way of example, one or more of the vents 90, 92, 94, 96, 100, 102 can be a standard vent (e.g., a dimensioned hole or aperture) that controls gas flow therethrough equally in both directions (i.e., in and out of adjacent chambers). In another example, one or more of the vents 90, 92, 94, 96, 100, 102 can be a one way vent that allows gas flow therethrough in only a single direction (e.g., allows gas in, but seals up when gas flow reversed). In still another example, one or more of the vents 90, 92, 94, 96, 100, 102 can have a compound or dual configuration wherein the vent is comprised of a first vent portion that operates like a one way vent (i.e., allows gas flow therethrough in a first direction, but closes when gas flow attempts to pass in a second, opposite direction) and a secondary vent that operates like a one way vent, but is reversed relative to the first vent portion (i.e., prevents gas flow therethrough in the first direction, but allows gas flow therethrough in the second, opposite direction). In addition, one of the first and second vent portions of this type of vent could be sized to allow a greater amount of gas flow therethrough in one direction than the other of the first and second vent portions allows in the opposite direction.

In a further example, one or more of the vents 90, 92, 94, 96, 100, 102 could be a pressure responsive or pressure controlled vent. This type of vent could restrict gas flow therethrough until a certain or predetermined pressure is reached within chamber at which time, for example, a cover or patch covering a vent hole could be pushed through the vent by the pressure to open the vent and allow gas flow therethrough. Tethers could be employed to hold the patch in place to restrict gas flow through the vent hole once the vent is open. In this example, the pressure controlled vent could be pressure controlled in only a first direction and could be completely open in a second, opposite direction. The foregoing example vent types are meant to be exemplary only and should not be considered as limiting of the types of vents that could be used. In addition, it is to be appreciated that any combination of vent types could be used for the vents 90, 92, 94, 96, 100, 102. For example, one or more of the vents 90, 92, 94, 96, 100, 102 could be of one type and one or more other of the vents 90, 92, 94, 96, 100, 102 could be of another type.

During a vehicle crash condition, the gas generator 46 is actuated and gas or inflation fluid is discharged from the gas generator 46 into the first inflation chamber 50. The gas generator 46 is configured to rapidly inflate the first inflation chamber 50. In one example, the vents 90, 92, 94, 96, 100, 102 are standard vent holes, though the sizes of the vents are varied relative to one another. In this example, larger vent holes could be used for the vents 90, 92 between the first chamber 50 and the second chambers 52, 54 to allow for faster filling and greater pressure within the chambers 50, 52, 54 relative to the third and fourth chambers 56, 58, 60. In contrast, smaller vent holes could be used for the vents 94, 96 and 100, 102 to allow the third and fourth chambers 56, 58, 60 to still fill, but at a slower rate and a lower pressure relative to the first and second chambers 50, 52, 54.

In another example, the vents 90, 92, 94, 96, 100, 102 are pressure sensitive vent holes. With pressure sensitive vent holes, the pressure and fill time of the first and second chambers 50, 52, 54 relative to the third and fourth chambers 56, 58, 60 can be increased significantly as compared to the use of standard vent holes. More specifically, when pressure sensitive vents are used, the vents between the chambers can initially be in a closed condition during inflation to block flow of gas between the chambers. However, when fluid pressure within the first chamber 50 has reached a second chamber predetermined minimum pressure (e.g., a pressure sufficient to expand the first chamber), the pressure responsive vents 90, 92 can move to an open condition to enable fluid to flow from the first chamber 50 into each of the second chambers 52, 54.

Similarly, when the fluid pressure within the first chamber 50 has reached a third chamber predetermined minimum pressure, the pressure responsive vents 94, 96 can likewise move to an open condition to enable fluid to flow from the first chamber 50 into each of the third chambers 56, 58. In one example, the second chamber minimum pressure is higher than the third chamber predetermined minimum pressure such that the second chambers 52, 54 are filled prior to the third chambers 56, 58 being filled. In a like manner, the vents 100, 102 can respectively move to an open condition when fluid pressure within the second chambers 52, 54 reaches a fourth chamber minimum predetermined pressure to enable fluid flow from the second chambers 52, 54 to the fourth chamber 60. It should be appreciated that the gas generator 46 can be configured or sized to create or maintain the respective predetermined minimum pressures of the inflation chambers 50, 52, 54, 56, 58 as the airbag 24 is being fully expanded.

In the illustrated embodiment, the separate inflation chambers 50, 52, 54, 56, 58, 60 provide varying coverage for different sized occupants and different crash modes. In addition, the vents 90, 92, 94, 96, 100, 102 can be selected to provide the chambers 50, 52, 54, 56, 58, 60 with desired pressure characteristics during impact. For example, the first chamber 50 can be a relatively low pressure chamber that is generally tuned for smaller and less massive occupants, for example, a person with physical characteristics similar to an AF5% crash test dummy, which can be used to model crash behavior of a hypothetical smaller female occupant. AF5% is an abbreviation for "American female $5^{th}$ percentile" and is generally representative of a person having a height of approximately 152 cm and a mass of approximately 50 kg.

Each second chamber 52, 54 can a high pressure chamber (e.g., high pressure relative to the first chamber 50) that is generally tuned for larger and more massive individuals, for example, a person with physical characteristics similar to an AM50% crash test dummy, which can be used to model the behavior of a hypothetical average sized male. AM50% is an abbreviation for American male $50^{th}$ percentile and is representative of a person having a height of approximately 175 cm and a mass of approximately 77 kg. Each third chamber 56, 58 can be a high pressure chamber (e.g., similar to the second chambers 52, 54) that provides protection for an out of position occupant that has his/her knees spread apart from a center of the seat 12 (i.e., outside a regulated knee impact zone. Finally, the fourth chamber 60 can be configured as a low pressure chamber (similar to the chamber 50) and can be deployed adjacent the steering column 28 of the vehicle V to prevent contact with the steering column.

During an impact that causes the airbag 24 to inflate, different pressure characteristics can be exhibited by the chambers 50, 52, 54, 56, 58, 60 depending on the types of vents employed (e.g., standard vent holes versus one way vents). With standard vent holes, during an AF5% impact to the first chamber 50, gas can flow back toward the inflator 46 and into the second and third chambers 52, 54, 56, 58 thereby producing a low pressure for the AF5% occupant. During an AF50% impact to the second chambers 52, 54, gas can only flow into the first and third chambers 50, 60 thereby producing a higher pressure to the AF50% occupant. The pressure increase in the second chambers 52, 54 relative to the first chamber 50 is, however, somewhat limited when standard vent holes are used.

For a greater pressure increase in the second chambers 52, 54 as compared to the first chamber 50, one way vents could be employed. In one example, one way vents could be used for the vents 90, 92 allowing flow from the first chamber 50 to the second chambers 50, 52, but preventing reverse flow from the second chambers 52, 56 back to the first chamber 50. Accordingly, during an impact to the second chambers 52, 54, such as an AF50% impact, gas can only flow into the third chamber 60 and is prevented by the one way vents from flowing back into the first chamber 50. This increases the pressure seen by the AF50% occupant when impacting the second chambers 52, 54; however, this use of one way vents would have no effect on the AF5% impact.

Figure 5:
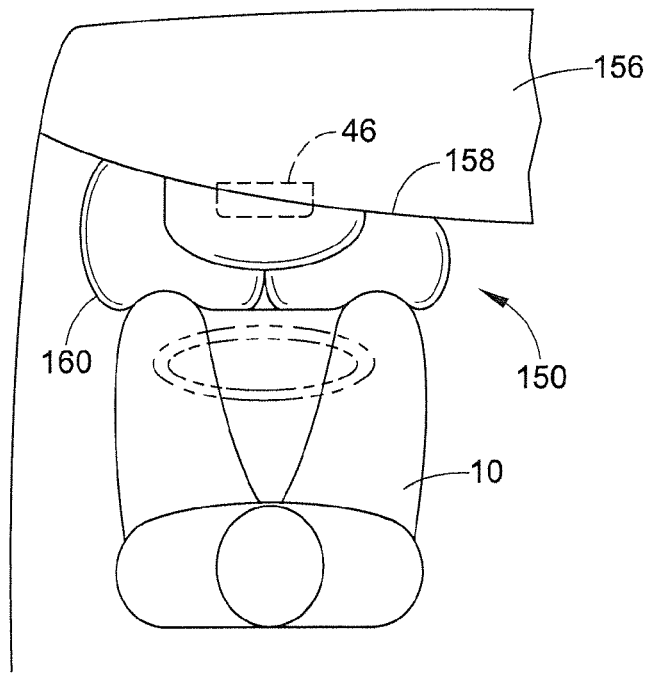
FIG. 5 is a top schematic view of another exemplary lower protection device deployed in a vehicle.

With reference to FIG. 5, another exemplary leg protection device for a supplemental passenger restraint system is illustrated. Similar to the previous embodiment, the leg protection device includes a multi-chamber knee airbag 150 that inflates through a deployment opening located in a lower portion of an instrument panel 156. The knee airbag 150 is operatively connected to gas generator 46 for receiving an inflation gas therefrom. When inflated to a deployed position, the knee airbag 150 covers the lower half of the instrument panel 156 and is positioned generally between the instrument panel 156 and the leg portions of the occupant 10 sitting in the driver's seat. As shown, an outer surface 158 of the instrument panel 156 is oriented at an angle such that one knee of the driver 10 is positioned closer to the instrument panel 156 than the other knee of the driver. To ensure that both knees are loaded at the same time during a crash condition, the knee airbag 150 is asymmetric in configuration. Particularly, an outer surface 160 of the knee airbag is angled with respect to the instrument panel 156 of the vehicle. Internal baffles within the knee airbag 150 control the shape of the separate inflation chambers, which can have different capacities, to account for the shape of the instrument panel 156. The asymmetric configuration or wedge shape of the knee airbag 150 provides for simultaneous contact to both legs of the occupant 10 for uniform load distribution.

Figure 6:
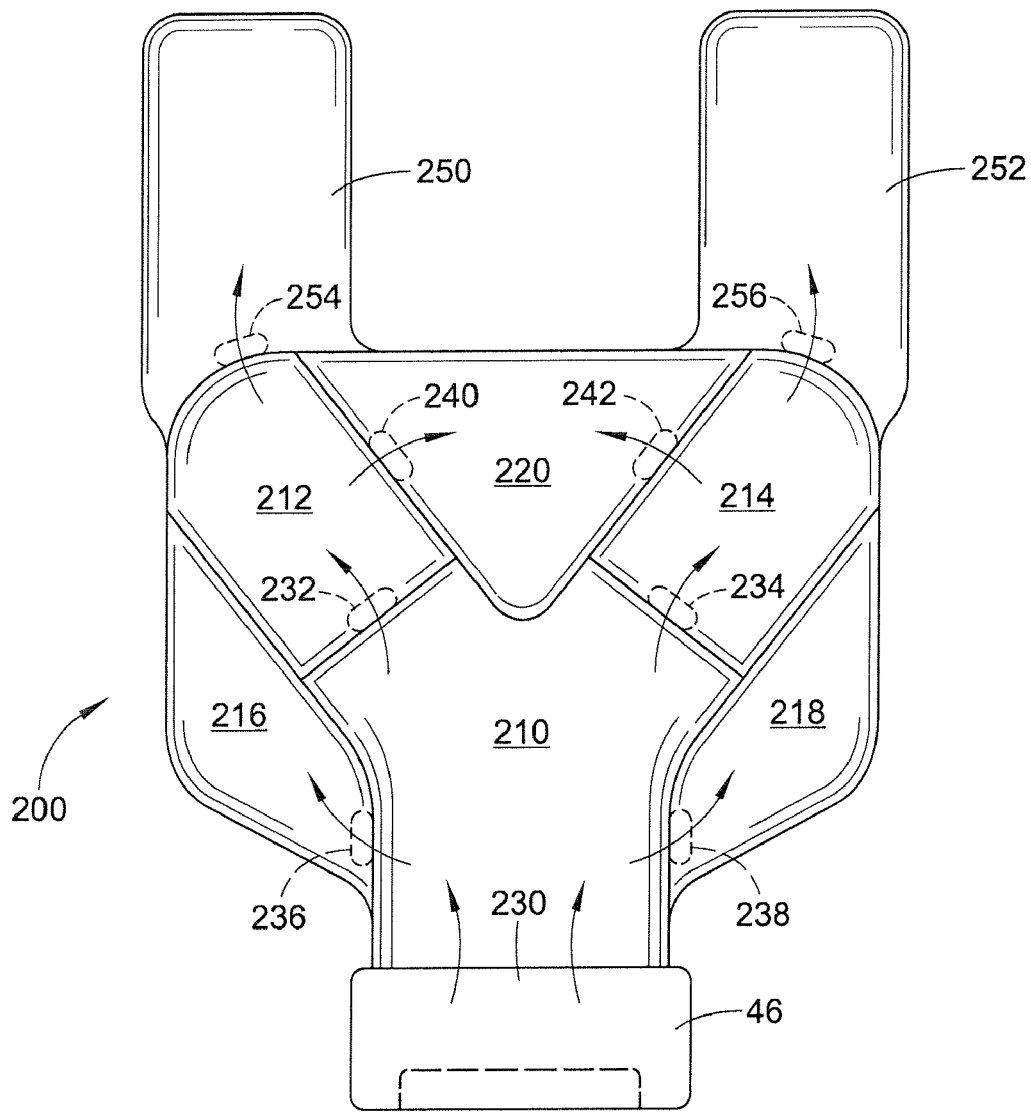
FIG. 6 is a front view of yet another exemplary lower protection device.

With reference to FIG. 6, yet another exemplary leg protection device for a supplemental passenger restraint system is illustrated. Similar to the embodiment depicted in FIG. 3, the leg protection device includes a multi-chamber knee airbag 200 defining a first inflation chamber 210, a pair of spaced apart second inflation chambers 212 and 214, a pair of spaced apart third inflation chambers 216 and 218 and a fourth inflation chamber 220. The first chamber 210 has an inlet 230 for directly receiving the gas generated by the gas generator 46. Each second inflation chamber 212, 214 has an vent or valve 232, 234 communicating with the first chamber 210. Each third inflation chamber 216, 218 has vent or valve 236, 238 communicating with the first chamber 210. The fourth chamber 220 has a pair of vents or valves 240, 242, each communicating with one of the pair of third chambers 212, 214. The vents or valves can be configured to create a desired inflation sequence for the chambers and/or to cause the chambers to exhibit desired pressures during impact in the manner already described herein.

Unlike the airbag 24 of FIG. 3, the knee airbag 200 further includes two arm-protecting inflation chambers 250 and 252, one on each side of the knee airbag. Each arm-protecting chamber 250, 252 has a vent or valve 254, 256 communicating with the respective second chambers 212, 214. Arm-protecting chamber 250 located on the left side of the knee airbag 200 is inflated so as to cover the left side area of the steering column 28. Arm-protecting chamber 252 located on the right side of the knee airbag 200 is inflated so as to cover the right side area of the steering column 28 and an upper portion of a center console panel 260 (FIG. 2).

In case of emergency such as a vehicle collision, the gas generator 46 is actuated, and the knee airbag 200 is inflated by the gas from the gas generator. The first, second, third and fourth inflation chambers 210, 212, 214, 216, 218, 220 can be inflated in the same manner described above with respect to the knee airbag 24. In addition, in this exemplary embodiment, gas flows through the second chambers 212, 214 to the respective arm-protecting chambers 250, 252 via vents 254, 256. The arm-protecting chambers are inflated and deployed in spaces on the left and right between the dashboard 30 and a backside of the steering wheel 26 to receive the left and right arms of the occupant 10. This prevents the left and right arms of the passenger from directly striking the vehicle body. The vents 254, 256 can be selected to achieve inflation of the second chambers 250, 252 at the desired time and/or in the desired sequence, and/or can be selected to achieve desired impact characteristics for the chambers 250, 252.

Figure 7:
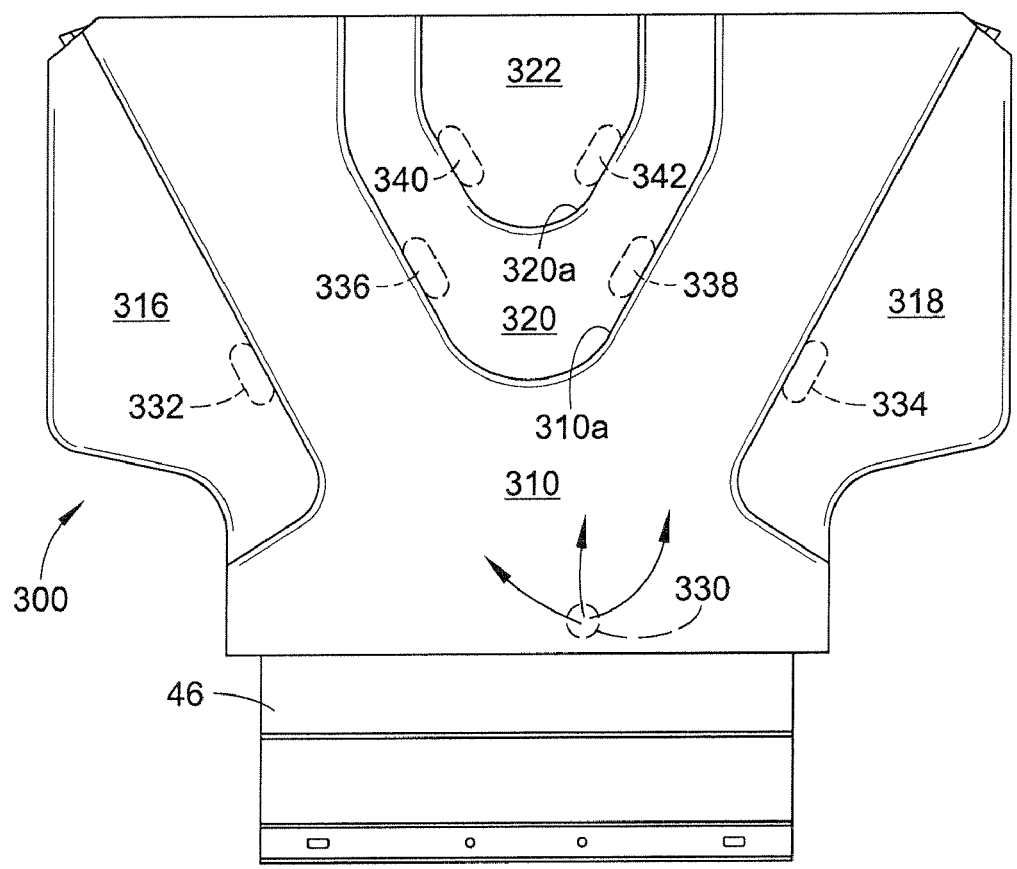
FIG. 7 is a front view of still another exemplary lower protection device.

With reference to FIG. 7, still another exemplary leg protection device for a supplemental passenger restraint system is illustrated. The illustrated leg protection device includes a multi-chamber knee airbag 300 defining a first inflation chamber 310, a pair of spaced apart second inflation chambers 316, 318 flanking the first inflation chamber 310, a V-shaped third inflation chamber 320 received within an upper recess 310a of the first inflation chamber, and a fourth inflation chamber 322 received within an upper recess 320a of the third inflation chamber 320. The first chamber 310 of this embodiment replaces the first and second chambers 50, 52, 54 of the FIG. 3 embodiment. The second chambers 316, 318 are similar to the third chambers 56, 58 of FIG. 3 and the third and fourth chambers 320, 322 replace the fourth chamber 60 of FIG. 3.

The first chamber 310 has an inlet 330 for directly receiving the gas generated by the gas generator 46. Each second inflation chamber 316, 318 has a vent or valve 332, 334 communicating with the first chamber 310. The third chamber 320 has a pair of vents or valves 336, 338 also communicating with the first chamber 310. The fourth chamber 322 has a pair of vents or valves 340, 342, each communicating with the third chamber 320. The vents or valves can be configured to create a desired inflation sequence for the chambers and/or to cause the chambers to exhibit desired pressures during impact in generally same manner as described in reference to the previous embodiments.

More particularly, for example, the first chamber 310 can be required to fill or inflate first (i.e., prior to filling of the other chambers) to provide initial restraint to an occupant upon deployment of the airbag 300. Next, the second chambers 316, 318 can be filled or inflated (i.e., after pressure within the first chamber 310 exceeds a second chamber minimum predetermined pressure) to provide protection laterally adjacent both sides of the first chamber 310. Next, the third chamber 320 can be filled or inflated (i.e., after pressure within the first chamber 310 exceeds a third chamber minimum predetermined pressure). The third chamber 320 can be sized and shaped (and positioned) to overlap a steering column cover and can be used to control a volume of the first chamber 310. Lastly, the fourth chamber 322 can be filled or inflated (i.e., after pressure within the third chamber 320 exceeds a fourth chamber minimum predetermined pressure). The fourth chamber 322 can be used to provide depth control around the vehicle's steering column, but can be removed when the airbag 300 is employed as a passenger side airbag.

A method of inflating a leg protection device for a vehicle, such as the leg protection device of FIGS. 1-4 having multi-chamber knee airbag 24, will now be described with reference to FIG. 8. The first inflation chamber 50 of the knee airbag 24 is first inflated by the gas generator 46 in response to a vehicle crash condition (S300). The first inflation chamber 50 is fluidly connected to a second inflation chamber and a separate third inflation chamber of the multi-chamber airbag 24 (S302). As shown in FIG. 3, the airbag 24 includes the pair of second chambers 52, 54 and the pair of third chambers 56, 58. The second inflation chamber 52, 54 is fluidly connected to the fourth inflation chamber 60 of the multi-chamber airbag 24 (S304). The second inflation chamber 52, 54 is inflated only after a fluid pressure in the first inflation chamber 50 exceeds a second chamber predetermined threshold pressure (S306). The third inflation chamber 56, 58 is inflated only after a fluid pressure in the first inflation chamber 50 exceeds a third chamber predetermined threshold pressure (S308). The fourth inflation chamber 60 is inflated only after a fluid pressure in the second inflation chamber 52, 54 exceeds a fourth chamber predetermined threshold pressure (S310). A plurality of vents 90, 92, 94, 96, 100, 102 allow selective communication between the first chamber 50 and each of the second chamber 52, 54 and third chamber 56, 58 and selective communication between the second chamber 52, 54 and the fourth chamber 60 are provided (S312). The plurality of vents 90, 92, 94, 96, 100, 102 can be configured to create or maintain a higher pressure in the second and/or third chambers 52, 54, 56, 58 relative to the first and/or fourth chambers 50, 60 by restricting ability of the gas to escape the second and third chambers (S314).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An airbag module for a vehicle comprising:
a gas generator for generating a gas; and
a multi-chamber airbag operatively connected to the gas generator for receiving the gas therefrom, the airbag defining at least one first inflation chamber, at least one second inflation chamber, at least one third inflation chamber and at least one fourth inflation chamber, the airbag including a plurality of internal vents configured to allow selective communication between the at least one first chamber and each of the at least one second chamber and the at least one third chamber and selective communication between one of the at least one second chamber and the at least one third chamber and the at least one fourth chamber, the plurality of internal vents configured to create a higher pressure in one or more selective chambers by restricting an ability of the gas to escape the one or more selective chambers, wherein an order of internal venting between the respective inflation chambers is predetermined so as to control pressure and inflation of the multi-chamber airbag,
wherein the airbag includes a plurality of internal baffles which define the inflation chambers, the internal baffles forming a generally Y-shaped first inflation chamber, and the fourth inflation chamber is at least partially received within an upper recess of the first inflation chamber.

2. The airbag module of claim 1, wherein a flow of gas from the at least one first chamber into the at least one second chamber is at a higher rate than a flow of gas from the first chamber into the at least one third chamber.

3. The airbag module of claim 1, wherein the airbag module is a leg protection device and the first chamber is a low pressure chamber that is tuned for occupants with physical characteristics similar to an AF5% crash test dummy.

4. The airbag module of claim 3, wherein the at least one second chamber is a high pressure chamber that is tuned for occupants with physical characteristics at least similar to an AM50% crash test dummy.

5. The airbag module of claim 3, wherein the at least one third chamber is a high pressure chamber that is tuned for an out of position occupant to protect knee impacts outside of a regulated knee impact zone.

6. The airbag module of claim 4, wherein the fourth chamber is configured as a low pressure chamber and is deployed adjacent an associated steering column cover of the vehicle.

7. The airbag module of claim 1, wherein the at least one second chamber includes two spaced apart second chambers and the at least one third chamber includes two spaced apart third chambers, each second chamber being deployed above one of the third chambers, the fourth chamber being deployed between the second chambers, wherein the first chamber is substantially surrounded by the second, third and fourth chambers.

8. The airbag module of claim 7, wherein the airbag includes a pair of first internal baffles and a pair of second internal baffles spaced from the pair of first baffles, the pair of first and second baffles together forming a generally Y-shaped inflation chamber which at least partially defines the first chamber and the two spaced apart second chambers.

9. The airbag module of claim 8, further including a pair of third internal baffles, each third baffle spanning between one of the first baffles and one of the second baffles for separating the first chamber from one of the second chambers, each third baffle including a vent for selective communication between the first chamber and the second chamber.

10. The airbag module of claim 8, wherein each first baffle separates the first chamber from one of the second chambers, each first baffle including a vent for selective communication between the at least one first chamber and the third chambers.

11. The airbag module of claim 8, wherein the pair of second baffles separates the second chambers from the at least one fourth chamber, each second baffle including a vent for selective communication between each second chambers and the at least one fourth chamber.

12. The airbag module of claim 1, wherein a depth of each of the at least one first chamber and the at least one fourth chamber is less than a depth of each of the at least one second chamber and the at least one third chamber.

13. The airbag module of claim 1, wherein the airbag module is a leg protection device, the airbag being asymmetric in configuration such that an outer surface of the airbag is angled with respect to an associated instrument panel of the vehicle, the asymmetric configuration of the airbag providing for substantially simultaneous contact to both legs of the occupant for uniform load distribution.

14. The airbag module of claim 1, wherein the airbag module is a leg protection device, the airbag including two arm-protecting chambers, one on each side of the airbag.

15. A leg protection device for a vehicle comprising:
a gas generator for generating a gas; and
a multi-chamber knee airbag operatively connected to the gas generator for receiving the gas therefrom for inflation, the airbag including:
  a first inflation chamber, the first chamber having an inlet for directly receiving the gas generated from the gas generator,
  a pair of second inflation chambers, each second inflation chamber having an inlet valve communicating with the first chamber,
  a pair of third inflation chambers, each third inflation chamber having an inlet valve communicating with the first chamber, and
  a fourth inflation chamber, the fourth chamber having a pair of inlet valves,
each inlet valve communicating with one of the pair of third chambers,
wherein the inlet valves are configured to create a higher pressure in the second and third chambers relative to the first and fourth chambers during inflation,
wherein actuation of the gas generator inflates the first chamber, the gas then flowing from the first chamber into the second chambers and then the third chambers, the gas then flowing from the second chambers into the fourth chamber following the flow of gas from the second chambers to the third chambers,
wherein the separate chambers provide varying coverage for different sized occupants and different crash modes,
wherein each second chamber is deployed above one of the third chambers in a stacked configuration, the first chamber being flanked by the stacked second and third chambers, the fourth chamber being deployed above the first chamber and between the second chambers.

16. The leg protection device of claim 15, wherein the first chamber is tuned for occupants with physical characteristics similar to an AF5% crash test dummy, each second chamber is tuned for occupants with physical characteristics at least similar to an AM50% crash test dummy, each third chamber is tuned for an out of position occupant to protect knee impacts outside a regulated zone, and the fourth chamber is deployed adjacent an associated steering column cover of the vehicle.

17. The leg protection device of claim 15, wherein the airbag includes a plurality of internal baffle forming a generally Y-shaped inflation chamber which at least partially defines the first chamber and the pair of second chambers.

18. A knee airbag module for a vehicle comprising:
a gas generator for generating a gas; and
a multi-chamber airbag operatively connected to the gas generator for receiving the gas therefrom, the airbag including a plurality of internals baffles defining separate inflation chambers configured to have differing pressures during inflation for providing varying coverage for different sized occupants, the separate chambers including:
  a first inflation chamber configured to provide initial restraint to an occupant upon deployment of the airbag,
  a pair of second inflation chambers flanking the first inflation chamber and configured to provide protection laterally adjacent sides of the first inflation chamber,
  a third inflation chamber received within an upper recess of the first inflation chamber and configured to provide protection against contact with an associated steering column cover of the vehicle, and
  a fourth inflation chamber received within an upper recess of the third inflation chamber and configured to provide depth control around the associated steering column cover of the vehicle;
wherein actuation of the gas generator inflates the first chamber, the gas then flowing from the first chamber into the second chambers and then the third chamber only after a fluid pressure in the first inflation chamber exceeds a predetermined first threshold pressure, the gas then flowing from the third chamber into the fourth chamber only after a fluid pressure in the third inflation chamber exceeds a predetermined second threshold pressure.

19. The knee airbag module of claim 18, wherein the airbag includes a plurality of internal vents configured to allow selective communication between the first chamber and each of the second chambers and the third chamber and selective communication between the third chamber and the fourth chamber, the plurality of internal vents being configured to maintain differing pressures between the first, second, third and fourth inflation chambers.

20. A method of inflating a leg protection device for a vehicle comprising the steps of:
inflating a first inflation chamber of a multi-chamber airbag, the first chamber fluidly connected to a second inflation chamber and a separate third inflation chamber of the multi-chamber airbag, the second inflation chamber fluidly connected to a fourth inflation chamber of the multi-chamber airbag;

inflating the second inflation chamber only after a fluid pressure in the first inflation chamber exceeds a first predetermined threshold pressure;

inflating the third inflation chamber only after a fluid pressure in the first inflation chamber exceeds a second predetermined threshold pressure; and inflating the fourth inflation chamber only after a fluid pressure in the second inflation chamber exceeds a third predetermined threshold pressure.

21. The method of claim 20, further comprising providing a plurality of vents configured to allow selective communication between the first chamber and each of the second chamber and third chamber and selective communication between the second chamber and the fourth chamber, the plurality of vents being configured to maintain a higher pressure in the second and third chambers relative to the first and fourth chambers by restricting ability of the gas to escape the second and third chambers.

22. A method of inflating a leg protection device for a vehicle comprising the steps of:

inflating a first inflation chamber of a multi-chamber airbag, the first chamber fluidly connected to a second inflation chamber and a separate third inflation chamber of the multi-chamber airbag, the third inflation chamber fluidly connected to a fourth inflation chamber of the multi-chamber airbag;

inflating the second inflation chamber only after a fluid pressure in the first inflation chamber exceeds a first predetermined threshold pressure;

inflating the third inflation chamber only after a fluid pressure in the first inflation chamber exceeds a second predetermined threshold pressure; and inflating the fourth inflation chamber only after a fluid pressure in the third inflation chamber exceeds a third predetermined threshold pressure.

23. The method of claim 22, further comprising providing a plurality of vents configured to allow selective communication between the first chamber and each of the second chamber and third chamber and selective communication between the third chamber and the fourth chamber, the plurality of vents being configured to maintain differing pressures between the first, second, third and fourth inflation chambers.

* * * * *